(12) United States Patent
Grogan et al.

(10) Patent No.: US 9,150,749 B2
(45) Date of Patent: Oct. 6, 2015

(54) STRIPABLE UNIFORM FILM COATING COMPOSITION WITH LOW RESIDUALS

(71) Applicant: Groco Specialty Coatings Company, Dallas, TX (US)

(72) Inventors: George W Grogan, Dallas, TX (US); Robert H Boyd, Dallas, TX (US)

(73) Assignee: Groco Specialty Coatings Company, Dallas, TX (US)

( * ) Notice: Subject to any disclaimer, the term of this patent is extended or adjusted under 35 U.S.C. 154(b) by 40 days.

(21) Appl. No.: 13/801,641

(22) Filed: Mar. 13, 2013

(65) Prior Publication Data
US 2013/0243993 A1    Sep. 19, 2013

Related U.S. Application Data

(60) Provisional application No. 61/611,980, filed on Mar. 16, 2012.

(51) Int. Cl.
| | | |
|---|---|---|
| B65B 33/00 | (2006.01) | |
| C09D 5/00 | (2006.01) | |
| C09D 133/08 | (2006.01) | |

(52) U.S. Cl.
CPC ............ C09D 133/08 (2013.01); *Y10T 428/23* (2015.01); *Y10T 428/24612* (2015.01)

(58) Field of Classification Search
CPC ......... C09D 5/20; C09D 5/008; C09D 133/08
USPC .......... 427/154, 155, 156; 524/502, 232, 388, 524/296
See application file for complete search history.

(56) References Cited

U.S. PATENT DOCUMENTS

| | | | | |
|---|---|---|---|---|
| 5,143,949 A | * | 9/1992 | Grogan et al. | 523/334 |
| 5,604,282 A | | 2/1997 | Grogan et al. | |
| 6,124,044 A | * | 9/2000 | Swidler | 428/500 |
| 6,555,615 B2 | * | 4/2003 | Van Rheenen | 524/606 |
| 6,936,649 B1 | * | 8/2005 | Grogan et al. | 524/268 |
| 7,153,356 B1 | * | 12/2006 | Harris et al. | 106/465 |
| 7,414,089 B2 | * | 8/2008 | Cheirrett et al. | 524/513 |
| 2002/0198298 A1 | * | 12/2002 | Arikawa et al. | 524/244 |

OTHER PUBLICATIONS 877-0019 Colortrend® Titanium White Material Safety Data Sheet—2008; Evonik Degussa Corporation, Parsippany, NJ; Material No. 10004682; Specification 139537; Order No. 01942964; Version 1.26/US; Revision Date: Feb. 2, 2008; Print Date: Mar. 25, 2008; 12 pages.
877-0019 Colortrend® Titanium White Material Safety Data Sheet—2009; Evonik Degussa Corporation, Parsippany, NJ; Material No. 10004682; Specification 139537; Order No. 02407987; Version 1.2.3/US; Revision Date: Oct. 28, 2009; Print Date: Jan. 7, 2010; 10 pages.

(Continued)

Primary Examiner — Michael Wieczorek

(57) ABSTRACT

A method of preparing a coating composition. The method comprises preparing a mixture that includes a releasing agent, thickening agents, and vinyl acetate-acrylic copolymer. Another embodiment is a method of forming a film, comprising, providing the coating composition and applying the coating composition to a surface. Another embodiment is a protective coating comprising a film, that includes the coating composition, applied to a surface of a manufactured product.

8 Claims, 4 Drawing Sheets

(56) References Cited

OTHER PUBLICATIONS

Acrysol™ ASE-60 Thickener Material Safety Data Sheet; Rohm and Haas, Philadelphia, PA; Order No. DA366423; MSDS No. 61656; Version: 004 01/05/0; 9 pages, Revision Date: Feb. 12, 2008.

Aqua-Cat™ Aqua Ammonia Material Safety Data Sheet; Southern Ionics Inc., West Point, MS; MSDS No. 097; Effective Date: Oct. 4, 2002; Revised Date: Jul. 26, 2006; 6 pages.

Benzoflex™ 9-88 Plasticizer Safety Data Sheet; Eastman Chemical Company, Kingsport, TN; Order No. DA359151; MSDS No. P13768VS; SDSUS/EN/20; Version No. 2.1, Revision Date: May 17, 2011; 12 pages.

Ethylene Glycol Safety Data Sheet; Nexeo Solutions, Columbus, OH; Product Code: 20005;MSDS No. R0000003; Version 2.10; Revision Date: Jun. 16, 2011; Print Date: Aug. 25, 2011; 12 pages.

Flexbond® 325 Emulsion Polymer Product Sheet; Air Products Polymers, L.P., Allentown, PA; 2001; 2 pages.

Flexbond® 325 Emulsion Safety Data Sheet; Ashland, Columbus, OH; Product Code: 666035; MSDS No. 000000119167; Version 1.2; Revision Date: Sep. 30, 2008; Print Date: Jan. 8, 2011; 9 pages.

Hydrite Thickener PA-2 Material Safety Data Sheet; Hydrite Chemical Co, Bookfield, WI; Product ID: MI113701; Revised: Aug. 10, 2011; Replaces: Aug. 10, 2011; 5 pages.

Nuosept® 95 Preservative Material Safety Data Sheet; Degussa Corp/Creanova Inc, Parsippany, NJ; MSDS No. 0145000 01-09; Approval Date: Dec. 10, 2001; Print Date: Feb. 4, 2002; 9 pages.

Polyox™ WSR N80 Material Safety Data Sheet; The Dow Chemical Company, Midland, MI; Issue Date: Nov. 20, 2007; Print Date: Jan. 12, 2011; 7 pages.

Rhodoline 643 Material Safety Data Sheet; Rhodia, Inc/Rhodia Novecare, Cranbury, NJ; Date Prepared: Apr. 24, 2008; Supersedes Date: Apr. 17, 2008; 8 pages.

Santicizer® 160 Bulk BP CHE PM Material Safety Data Sheet; Ferro Corporation, Bridgeport, NJ; Product Code: 1034074; Order No. DA287930; MSDS No. MS001482; Version: 009 Nov. 1, 2010; 7 pages.

Strodex® PK-90 Phosphate Ester Surfactant; Hercules Inc., Wilmington, DE; MSDS No. 999 8000 0402; SAP Code: 500PH5221A00000015; Issue Date: Dec. 20, 2007; 5 pages.

Tinuvin 1130 Material Safety Data Sheet; Ciba Corporation, Tarrytown, NY; Release 1.1; Date Revised: Jul. 15, 2008; 7 pages.

Tinuvin 1130 Material Safety Data Sheet; Ciba Corporation, Tarrytown, NY; Approval Date: Apr. 14, 1998; Supersedes Date: Nov. 11, 1997; 14 pages.

\* cited by examiner

STRIPABLE UNIFORM FILM COATING COMPOSITION WITH LOW RESIDUALS

CROSS-REFERENCE TO RELATED APPLICATION

This application claims the benefit of U.S. Provisional Application Ser. No. 61/611,980, filed on Mar. 16, 2012, to Grogan et al., entitled, "STRIPABLE UNIFORM FILM COATING COMPOSITION WITH LOW RESIDUALS;" which is incorporated herein by reference in its entirety.

TECHNICAL FIELD

This application relates to polymer-based protective film coating mixtures, and more particularly, vinyl acetate-acrylic copolymer based film coating mixture that is easily strippable from a non-porous surface.

BACKGROUND

Various film coating compositions are often sprayed on the outer surfaces of manufactured products so as to protect the product from damage during further processing and/or transporting. The film coating should be easily and uniformly applied to only the desired surfaces of the product, that is, without overspray or sagging of the applied coating composition, even on vertically oriented surfaces, before the composition sets to form a film. The film coating should also be easily removed without leaving residual material thereby necessitating further cleaning or treatment of the product.

SUMMARY

One embodiment is method of preparing a coating composition. The method comprises preparing a mixture that includes a releasing agent, thickening agents, and vinyl acetate-acrylic copolymer.

Another embodiment is a method of forming a film, comprising, providing a coating composition that includes a releasing agent, a thickening agent, and a vinyl acetate-acrylic copolymer. The method also comprises applying the coating composition to a surface.

Another embodiment is a protective coating. The protective coating comprises a film applied to a surface of a manufactured product. The film including a coating composition that includes a releasing agent, a thickening agent, and a vinyl acetate-acrylic copolymer.

BRIEF DESCRIPTION OF THE DRAWINGS

Reference is now made to the following descriptions taken in conjunction with the accompanying drawings, in which.

DETAILED DESCRIPTION

The term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the present disclosure benefit from the recognition that the precise control of the viscosity of the disclosed coating composition facilitates the uniform application of the coating to form a film without overspray or sagging of the applied coating composition, regardless of whether the coating is applied to a vertical surface or horizontal surface (e.g., perpendicular or parallel to the earth's surface, respectively). The choices of the thickening agents and their amounts in the coating composition are important to controlling the coating's viscosity. Consequently, the particular combinations of the components in the coating compositions disclosed herein provide films with surprisingly strong and uniform thickness. Surprisingly, these films can be readily removed from a surface being protected, without substantial amounts of residual material being left behind on the surface.

Figure 1:
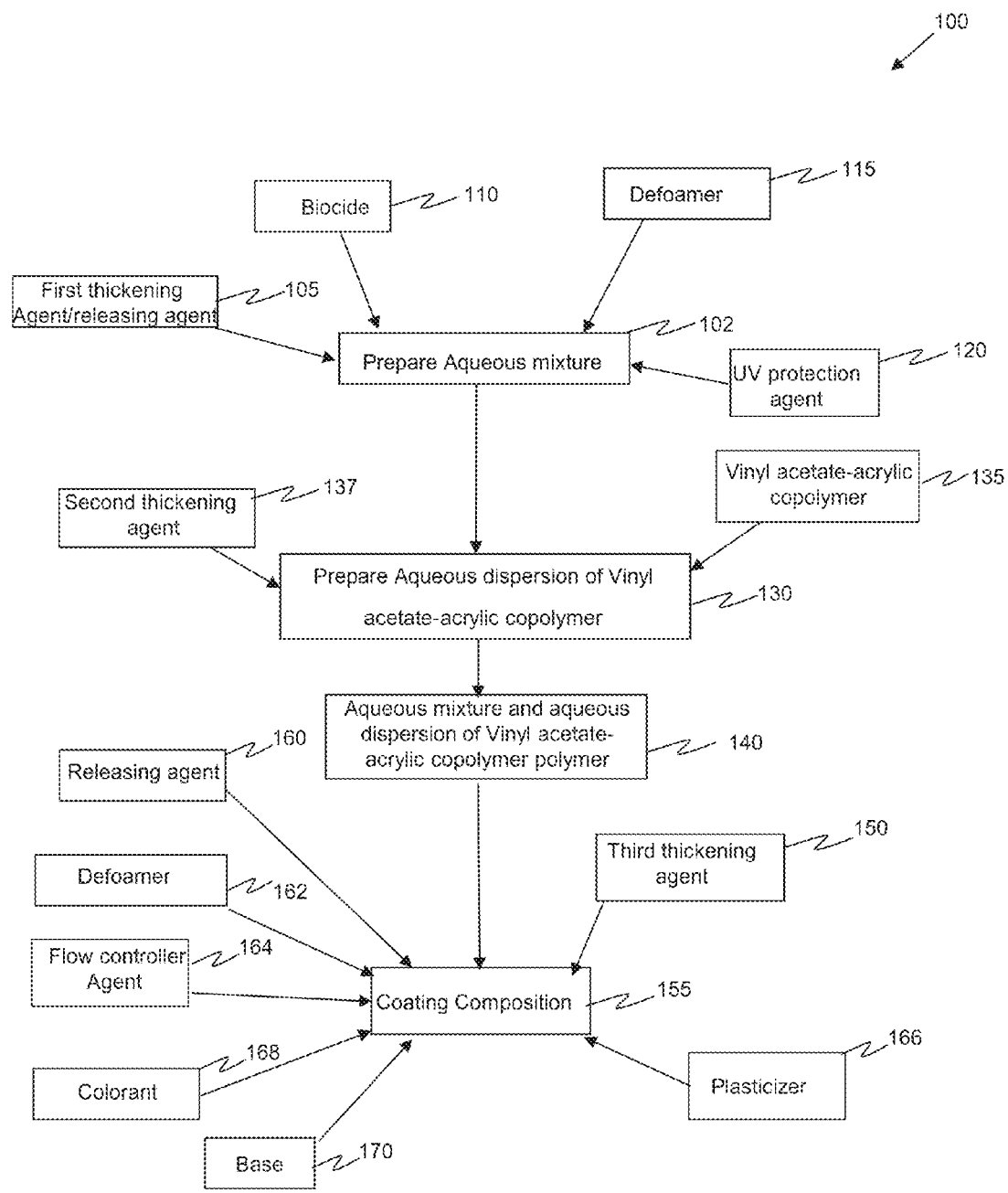
FIG. 1 presents a flow diagram of a method of preparing a coating composition.

One embodiment of the disclosure is a method of preparing a coating composition which comprises mixing a releasing agent, vinyl acetate-acrylic copolymer and the thickening agent together. FIG. 1 presents a flow diagram of an example method of preparing a coating composition of the disclosure.

Some embodiments of method 100 include preparing an aqueous mixture (step 102). Preparing the aqueous mixture (step 102) can include adding to water, a first thickening agent and releasing agent (step 105), a biocide (step 110), a defoamer (step 115), and a UV protection agent (step 120). In some embodiments, these components are added in the order presented herein. In some embodiments, one or more of the biocide, defoamer, and UV protection agent are optional.

For example, in some embodiments, to a mixing chamber containing from about 65 to about 70 lbs, and in some cases, about 67.7 lbs of water, in step 102, the first thickening agent (e.g., a viscosity building agent) added in step 105 includes Poly(ethylene oxide), such as provided from about 7 to about 10 lbs, and in some cases, about 8 lbs POLYOX™ WSR N80 (Dow Chemical Company). In some cases, the thickening agent, such as Poly(ethylene oxide), is also a releasing agent in that it facilitates the easy removal of the film from the coating composition. For instance, the film can be stripped from a product surface is a single step without leaving substantial amounts of the film behind on the surface that have to be removed in separate additional steps.

For example, the biocide added in step 110 can include bicyclic oxazolidines, such as provided from about 1 to 1.5 lbs, and in some cases about 1.34 lbs, of NUOSEPT® 95 PRESERVATIVE (CREANOVA, Inc., Parsippany. N.J.). For example, the defoamer added in step 115 includes petroleum hydrocarbon-based foam control agent such as provided from about 1 to about 3 lbs, and in some cases about 2 lbs, of RHODOLINE 643 (RHODIA INC., Cranbury N.J.). For example, the UV protection agent added in step 120 can be provided from about 2 to about 3 lbs, and in some cases about 2.5 lbs, of TINUVIN 1130 (Ciba Corporation, Tanytown, N.Y.).

The method 100 also comprises a step 130 of preparing an aqueous dispersion of vinyl acetate-acrylic copolymer, which includes a step 135 of providing a vinyl acetate-acrylic copolymer and a step 137 of adding a second thickening agent (e.g., a different viscosity building agent) to the vinyl acetate-acrylic copolymer.

For example in some embodiments, to a second mixing chamber in step 135, an aqueous dispersion of a vinyl acetate-acrylic copolymer, (about 50 to 60 wt %), surfactant (about 1.5 to 5 wt %), and vinyl acetate monomer (about 0.5 to 1 wt %), balance water, is provided. In some cases, such an aqueous dispersion is provided by adding from about 700 to about 800 lbs, and in some cases about 729 lbs, of FLEX-BOND® 325 EMULSION (Ashland, Columbus, Ohio), now known as AVICOR® 325 (Celanese Emulsion Polymer, Dallas, Tex.), to the second mixture chamber. For example, in some embodiments, in step 137, a second thickening agent, such as a mixture of acrylate ester and methacrylic acid mixture, such as provided from about 8 to about 16 lbs of ACRYSOL™ ASE-60 Thickener (Rohm and Haas Company Philadelphia, Pa.), is gradually mixed into the aqueous dispersion of vinyl acetate-acrylic copolymer.

The method 100 also comprises a step 140 of mixing the aqueous mixture (prepared in step 102) and the aqueous dispersion of vinyl acetate-acrylic copolymer (prepared in step 130) together. For example, in some embodiments, in step 140, one of the above-described embodiments of the aqueous mixture is poured from the first mixing chamber into the second mixing chamber, which contains one of the above-described embodiments of the aqueous dispersion of vinyl acetate-acrylic copolymer.

Some embodiments of the method 100 also comprise a step 150 of preparing a third thickening agent (e.g., another different viscosity building agent). In some embodiments, preparing the third thickening agent in step 150 includes polyacrylate, such as provided from about 4 to about 12 lbs, and in some cases about 8.5 lbs of HYDRITE THICKENER PA-2 (Hydrite Chemical Co. Brookfield, Wis.) mixed with about 20 to about 25 lbs, and in some cases, about 22.5 lbs of water, until the thickening agent is uniformly dispersed in the water.

Some embodiments of the method 100 also comprise a step 155 of adding the thickening agent (e.g., such as prepared in step 150) to the mixture of the aqueous mixture and aqueous dispersion of vinyl acetate-acrylic copolymer (e.g., such as prepared in step 130) to completing the preparation of the coating composition.

Some embodiments of the method 100, further include adding and mixing additional components into the coating composition prepared in step 155. These steps can include adding to coating composition, a releasing agent (step 160), a defoamer (step 162), flow control agent (step 164), a plasticizer (step 166), a colorant (step 168) and a base (step 170). In some embodiments, these components are added in the order presented herein. In some embodiments, one or more of the these additional components are optional.

For example, in some cases, step 160 includes adding from about 1 to about 3 lbs, and in some cases, about 2 lb of STRODEX® PK-90 PHOSPHATE ESTER SURFACTANT (Hercules Incorporated, Wilmington, Del.) to the coating composition. For example, in some cases, step 162 includes adding defoamer that includes petroleum hydrocarbon-based foam control agents such as provided from about 1 to about 3 lbs, and in some cases, about 2 lbs of RHODOLINE 643. For example, in some cases, step 164 includes adding the flow control agent such as provided from about 2 to about 4 lb, and in some cases, about 3.25 lbs of ethylene glycol (Nexeo Solutions, Columbus, Ohio). For example, in some cases, step 166 includes adding a plasticizer such as provided from about 5 to about 10 lbs, and in some cases, about 6.75 lbs of butyl benzyl phthalate, such as provided from Santicizer® 160 (Ferro corporation, Bridgeport N.J.) and dipropylene glycol dibenzoate, such as provided from about 10 to about 15 lbs, and in some cases about 11.5 lbs, of Benzoflex™ 9-88 Plasticizer (Eastman Chemical Company, Kingsport, Tenn.). For example, in some cases, step 168 includes adding a colorant that includes titanium dioxide, such as provided from about 15 to about 20 lbs and in some cases about 17.61 lb 877-0019 COLORTREND® TITANIUM WHITE (Evonik Degussa Corporation, Parsippany, N.J.). For example, in some cases, step 168 includes adding ammonia hydroxide, such as provided from about 2 lbs to 4 lbs, and in some cases about 3 lbs, of an about 19 to 30 wt % aqueous ammonia hydroxide solution such as provided by AQUA-CAT™ AQUA AMMONIA (Southern Ionics Inc., West Point, Miss.), or an amount that gives the coating composition a basic pH and in some cases, a pH of about 9.

Figure 1A:
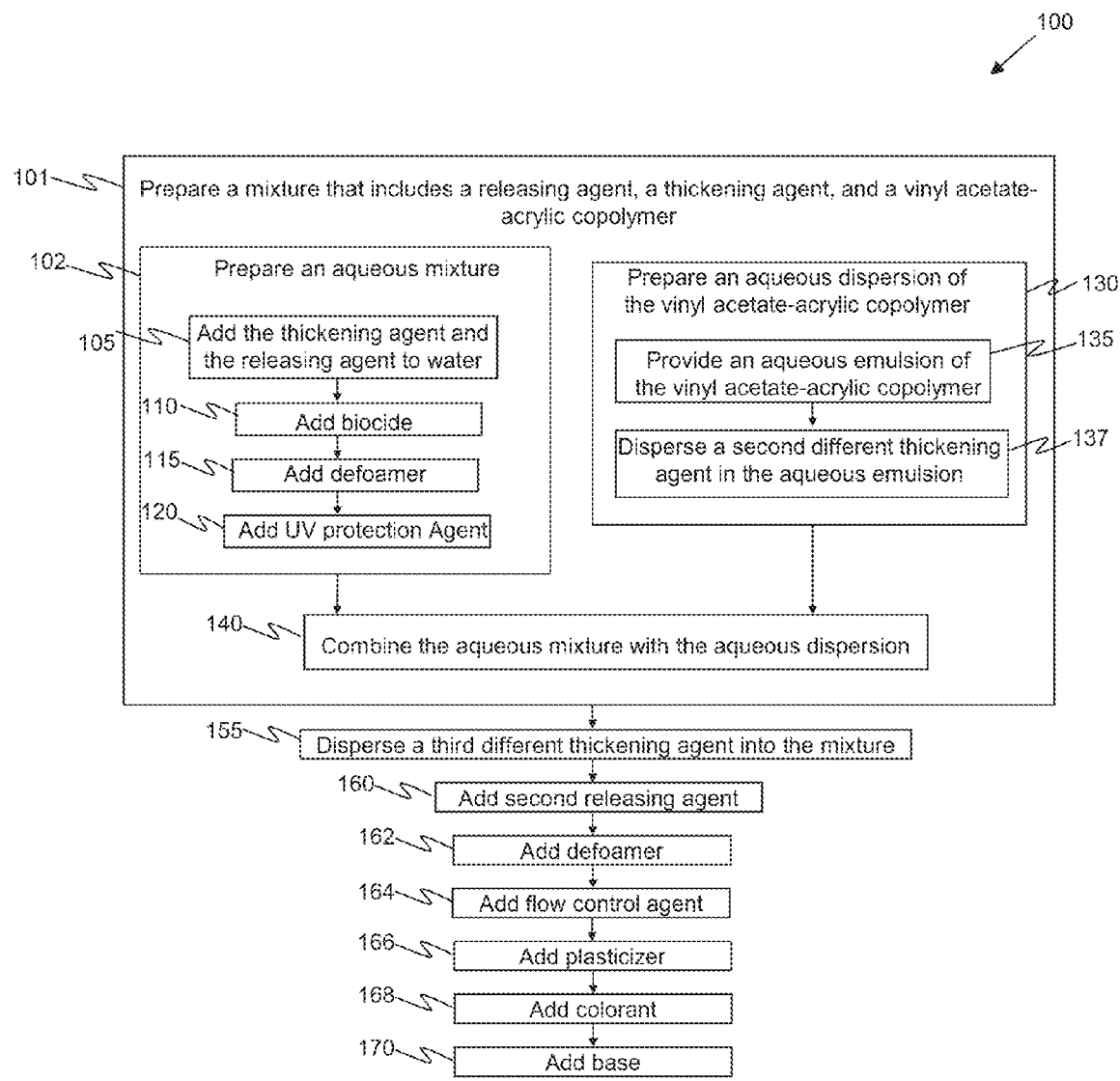
FIG. 1A present another flow diagram of the method of preparing embodiments of the coating composition.

FIG. 1A present another flow diagram of various aspects of embodiments of the method 100 of preparing a coating composition. The method 100 comprises step 101 of preparing a mixture (101) that includes a releasing agent, a thickening agent, and a vinyl acetate-acrylic copolymer. In some embodiments, preparing the mixture (step 101) includes a step 102 of preparing an aqueous mixture.

In some embodiments preparing the aqueous mixture (step 102) includes a step 105 of adding the thickening agent and the releasing agent to water. In some cases, the thickening agent has a different chemical composition than the releasing agent, e.g., one or both of the second or third thickening agents disclosed herein. In some cases, the thickening agent is also the releasing agent, thereby reducing material costs. For instance, in some such cases as part of step 105, the thickening agent and the releasing agent include poly(ethylene oxide)

In some embodiments, the thickening agent and the releasing agent are both provided in a concentration range equivalent to about 7 to about 10 pounds per about 65 to about 70 pounds of water. The term, concentration equivalent as used herein, refers to the concentrations that correspond to the example amounts of the various components coating composition disclosed herein. As an example, consider the case when the thickening agent and the releasing agent are both provided, e.g., as poly(ethylene oxide, as 7 pounds per 80 pounds of water in step 105. Equivalent concentrations of the thickening agent and the releasing agent include about 0.08 pounds of poly(ethylene oxide per pound of water, or, 8 wt % of poly(ethylene oxide. As another example, when the thickening agent and the releasing agent are both provided as 10 pounds per pounds of water, equivalent concentration are 0.125 pounds per pound of water or 1.25 wt %. One skilled in the pertinent arts would understand that equivalent concentrations would also molar equivalent concentrations.

In some embodiments, preparing the aqueous mixture (step 102) further includes adding one or more additional components to the aqueous mixture formed in step 105.

For instance, in some embodiments, preparing the aqueous mixture (step 102) further includes a step 110 of adding a biocide that includes bicyclic oxazolidines in a concentration equivalent to about 1 to about 1.5 pounds in the aqueous mixture.

For instance, in some embodiments, preparing the aqueous mixture (step 102) further includes a step 115 of adding a defoamer that includes a petroleum hydrocarbon-based foam control agent in a concentration corresponding to about 1 to 1.5 pounds in the aqueous mixture. For instance, in some embodiments, preparing the aqueous mixture (step 102) further includes a step 120 of adding a UV protection agent in a concentration range corresponding to about 2 to about 3 pounds in the aqueous mixture. In some such embodiments, the UV protection agent can include one or both of Poly(oxy-1,2-ethanediyl),α-[3-[3-(2H-benzotriazol-2-yl)-5-(1,1-dimethylethyl)-4-hydroxyphenyl]-1-oxopropyl]Ω-[3-[3-(2H-benzotriazol-2-yl)-5-(1,1-dimethylethyl)-4-hydroxyphenyl]-1-oxopropoxy]- (e.g., CAS 104810-47-1, 30-60 wt %) and Poly(oxy-1,2-ethanediyl),α-[3-[3-(2H-benzotriazol-2-yl)-5-(1,1-dimethylethyl)-4-hydroxyphenyl]-1-oxopropyl]-Ω-hydroxy (e.g., CAS 104810-48-2, 30-60 wt %).

In some embodiments preparing the mixture (step 101) includes a step 130 of preparing an aqueous dispersion of the vinyl acetate-acrylic copolymer. In some cases preparing the aqueous dispersion (step 130) includes a step 135 of providing an aqueous emulsion of the vinyl acetate-acrylic copolymer. In some such embodiments, the aqueous emulsion includes about 50 to about 60 wt % of a vinyl acetate-acrylic copolymer, about 1.5 to about 5 wt % of a surfactant, about 0.5 to about 1 wt % of a vinyl acetate monomer, and balance water.

In some embodiments, preparing the aqueous dispersion (step 130) further includes a step 137 of dispersing a second different thickening agent in the aqueous emulsion. In some such embodiments the second thickening agent includes a combination of acrylate ester and methacrylic acid. In some embodiments, the concentration of the added combination of acrylate ester and methacrylic acid is equivalent to about 8 to about 16 pounds acrylate ester and methacrylic acid in about 700 to about 800 of the aqueous emulsion.

In some embodiments, preparing the mixture (step 101) includes a step 140 of combining the aqueous mixture, having at least the thickening agent and the releasing agent (e.g., the aqueous mixture after step 102, but in some cases after any or all of steps 110-120), with the aqueous dispersion (e.g., the aqueous dispersion after step 130, but in some cases after any or all of steps 135-137). In some cases in step 140, the aqueous mixture is added to the aqueous dispersion. In some such embodiments, the weight ratio of the aqueous mixture to the aqueous dispersion is equivalent to a range of about 70 to about pounds of the aqueous mixture to about 700 to about 900 pounds of the aqueous dispersion.

In some embodiments, the method 100 further includes a step 155 dispersing a third different thickening agent into the mixture (step 101, e.g., in some cases, the aqueous mixture plus the aqueous dispersion prepared in step 140). In some such embodiments, the third thickening agent includes polyacrylate in a concentration equivalent to about 20 to about 25 pounds in a total weight of the mixture of the aqueous mixture plus the aqueous dispersion.

In some embodiments, the method 100 further includes dispersing, into the mixture (step 101, and in some cases, the aqueous mixture plus the aqueous dispersion prepared in step 140), one or more of additional components.

For instance, in some embodiments, the method 100 further includes a step 160 of adding a second releasing agent to the mixture of the aqueous mixture plus the aqueous dispersion (step 140). In some such embodiments, the second releasing agent includes a phosphate ester salt in a concentration equivalent to about 1 to about 3 pounds in a total weight of the mixture of the aqueous mixture plus the aqueous dispersion.

For instance, in some embodiments, the method 100 further includes a step 162 of adding a defoamer to the mixture of the aqueous mixture plus the aqueous dispersion (step 140). In some such embodiments, the defoamer includes a petroleum hydrocarbon-based foam control agents in a concentration equivalent to about 1 to about 3 pounds in the total weight of the mixture of the aqueous mixture plus the aqueous dispersion.

For instance, in some embodiments, the method 100 further includes a step 164 of adding a flow control agent to the mixture of the aqueous mixture plus the aqueous dispersion (step 140). In some such embodiments, For instance, in some embodiments, the method 100 further includes a step 166 of adding a plasticizer to the mixture of the aqueous mixture plus the aqueous dispersion (step 140). In some such embodiments, the flow control agent includes ethylene glycol in a concentration equivalent to about 2 to about 4 pounds in the total weight of the mixture of the aqueous mixture plus the aqueous dispersion.

For instance, in some embodiments, the method 100 further includes a step 168 of adding a colorant to the mixture of the aqueous mixture plus the aqueous dispersion (step 140). In some such embodiments, the plasticizer includes butyl benzyl phthalate and dipropylene glycol dibenzoate in a concentration equivalent to about 5 to about 10 pounds in the total weight of the mixture of the aqueous mixture plus the aqueous dispersion.

For instance, in some embodiments, the method 100 further includes a step 170 of adding a base to the mixture of the aqueous mixture plus the aqueous dispersion (step 140). In some such embodiments, the base includes ammonia hydroxide in a concentration equivalent to about 2 to about 4 pounds of an about 19 to 30 wt % aqueous ammonia hydroxide solution in the total weight of the mixture of the aqueous mixture plus the aqueous dispersion. The base is provided in sufficient amounts so as to provide the aqueous mixture plus the aqueous dispersion with a pH of greater than 7.

Figure 2:
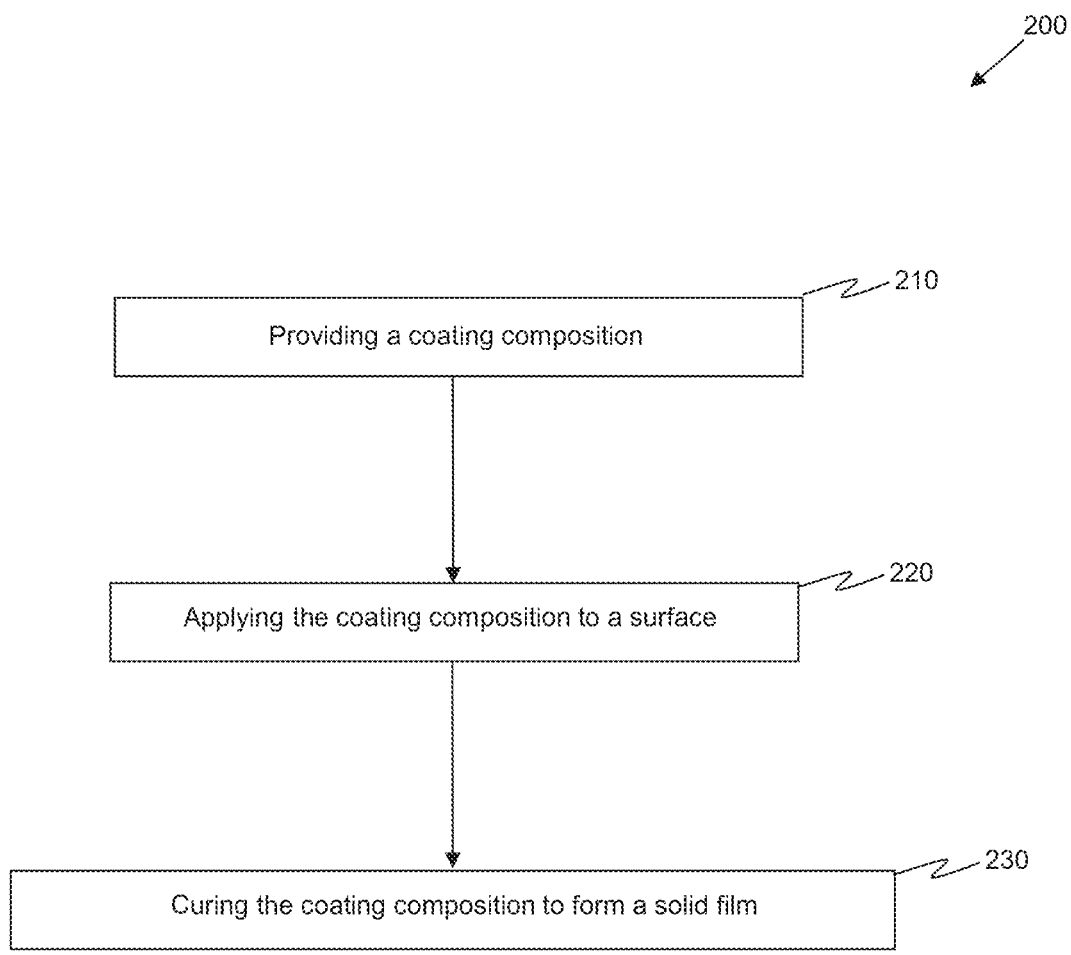
FIG. 2 presents a flow diagram of an example method of applying a coating composition, such as any of the coating compositions formed from the method described in the content of FIGS. 1-1A, to form a film.

Another embodiment is forming a film of the coating composition. FIG. 2 presents a flow diagram of an example method 200 of forming a film of the disclosure, such a film formed from any of the coating compositions formed from the example method described in the content of FIG. 1.

As illustrated in FIG. 2, the method 200 includes a step 210 of providing a coating composition, such as any of the above-described coating compositions formed by one or more embodiments the method 100 as discussed in the context of FIG. 1. The coating composition provided in step 210 has a viscosity value (e.g. dynamic viscosity) in a range from about 102 to about 121 Krebs units (KU), and in some cases, from about 108 to about 110 KU, and in some cases, from 115 KU to about 118 KU.

All viscosity measures disclosed herein assume the use of a Stormer-type viscometer (e.g., Model No. 9730G45, Thomas Scientific, Swedesboro, N.J.), using a measurement temperature of about 77° F. The viscosity measurements are performed as described in accordance with ASTM D-562, Method for Determination of Consistency of Paint Using the Stormer Viscometer, which is incorporated herein in its entirety.

The method 200 further includes a step 220 of applying the coating composition provided in step 210 to a surface. In some cases, for example, the surface is the surface of a manufactured product such as a vehicle or window. The step 220 of applying the coating can include, but is not limited to, rolling, brushing, extruding, pouring or otherwise dispensing the coating composition onto the surface, or in some cases, dipping the product into a container holding the coating composition.

Some embodiments of method further include a step 230 of curing the coating composition applied to the surface to form a solid film. In some cases curing the coating composition includes allowing the applied composition air-dry at room temperature for a suitable period commensurate with the thickness of the coating composition applied to the surface. For instance, in some cases an about 20 mils thick layer of the coating composition can air-dry, to human touch, in at least about 1 hr and cure in about 24 hours. In other cases, to speed curing, the coating composition is exposed to an elevated temperature e.g., greater than about 70° F. to 100° F. or to moving air.

Figure 3:
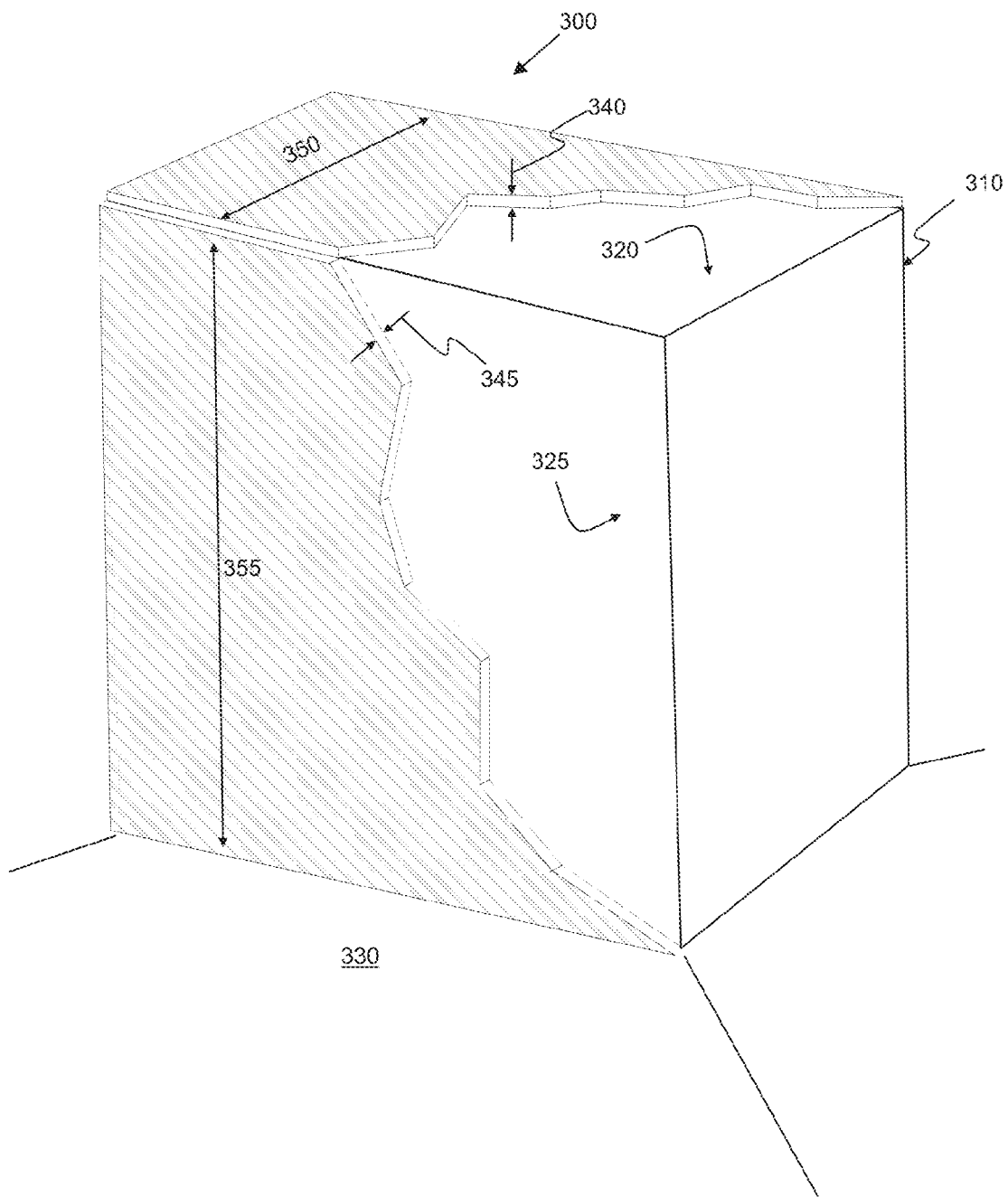
FIG. 3 presents a schematic view of a protective coating that comprises a film of the coating composition, such as any of the coating compositions described in the context of FIG. 1-2.

Another embodiment of the present disclosure is a film of the above-described coating composition. FIG. 3 presents a schematic view of an example film 300 of the coating composition, such a film formed by applying any of the example coating compositions or films described in the context of FIGS. 1 and 2, to a product 310.

As illustrated in FIG. 3, in some embodiments the film 300 is uniformly applied regardless of whether the film 300 is applied to a horizontal surface 320 or vertical surface 325 (e.g., surfaces substantially horizontal and perpendicular to the earth's surface 330, respectively. For instance, in some embodiments the thickness 340 of the layer 300 applied to a horizontal surface 320 and the thickness 345 of the layer 300 applied to a vertical surface 325 are the same within about 20 percent and more preferably within about 10 percent and even more preferably within about 5 percent. For instance, in some embodiments the thickness 340 of the layer 300 applied to along an entire horizontal dimension 350 of the product surface 320 is the same within about 20 percent and more preferably within about 10 percent and even more preferably within about 5 percent. For instance, in some embodiments the thickness 345 of the layer 300 applied to along an entire vertical dimension 355 of the product surface 320 is the same within about 20 percent and more preferably within about 10 percent and even more preferably within about 5 percent.

One of ordinary skill in the pertinent art would understand how the percentage dry weight compositions of the various components in the layer 300 would change as compared to the coating composition, e.g., based on the amount of volatile components (e.g., water and volatile organic compounds) that are removed during a curing step 230. For instance, consider a coating applied with a thickness in a range of about 6 to 20 mils, which upon curing, forming into a dried film layer with about one-half of that thickness (e.g., thickness 340, 345) of about 3 to 10 mils, respectively. One of ordinary skill would be able to determine the weight of lost volatile compounds and estimate the weight percent compositions of the non-volatile compounds remaining in the layer 300.

Based upon various embodiments of the method discussed in the context of FIG. 1-2, in some cases, the film of the coating composition includes a releasing agent, a thickening agent, and a vinyl acetate-acrylic copolymer.

Although the present invention has been described in detail, one of ordinary skill in the pertinent art should understand that they can make various changes, substitutions and alterations herein without departing from the scope of the invention.

What is claimed is:

1. A method of preparing a coating composition, comprising:
    preparing in a first mixing chamber an aqueous mixture of water and a first thickening/releasing agent of poly(ethylene oxide), wherein a concentration of the first thickening/releasing agent ranges from about 7 to about 10 pounds per about 65 to about 70 pounds of water;
    preparing an aqueous dispersion mixture of vinyl acetate-acrylic copolymer in a second mixing chamber, including adding a second thickening agent of a mixture of acrylate ester and methacrylic acid mixture to the aqueous dispersion mixture, wherein a concentration of the second thickening agent ranges from about 8 to about 16 pounds in about 700 to about 800 pounds of the aqueous dispersion mixture;
    combining the aqueous mixture to the aqueous dispersion mixture to prepare a coating mixture;
    adding a third thickening agent of polyacrylate to the coating mixture, wherein a concentration of the third thickening agent ranges from about 4 pounds to about 12 pounds of the polyacrylate to about 20 to about 25 pounds of water, wherein the first, second, and third thickening agents have different viscosities; and
    adding a second releasing agent of phosphate ester salt to the coating mixture.

2. The method of claim 1, wherein preparing the aqueous mixture further includes adding a biocide, defoamer, and an ultraviolet light protection agent to the aqueous mixture.

3. The method of claim 2, wherein adding the biocide includes adding a bicyclic oxazolidines in a concentration equivalent to about 1 to about 1.5 pounds in the aqueous mixture;
    adding the defoamer includes petroleum hydrocarbon-based foam control agent in a concentration corresponding to about 1 to 1.5 pounds in the aqueous mixture; and
    adding the UV protection agent in a concentration range corresponding to about 2 to about 3 pounds in the aqueous mixture, and including one or both of:
    Poly(oxy-1,2-ethanediyl), α-[3-[3-(2H-benzotriazol-2-yl)-5-(1,1-dimethylethyl)-4-hydroxyphenyl]-1-oxopropyl]-Ω-[3-[3-(2H-benzotriazol-2-yl)-5-(1,1-dimethylethyl)-4-hydroxyphenyl]-1-oxopropoxy]-; and
    Poly(oxy-1,2-ethanediyl), α-[3-[3-(2H-benzotriazol-2-yl)-5-(1,1-dimethylethyl)-4-hydroxyphenyl]-1-oxopropyl]-Ω-hydroxy.

4. The method of claim 1, wherein the phosphate ester salt of the second releasing agent is added in a concentration equivalent to about 1 to about 3 pounds in a total weight of the coating mixture.

5. The method of claim 1, wherein preparing the aqueous dispersion mixture includes providing an aqueous emulsion that includes:
    about 50 to about 60 wt % of a vinyl acetate-acrylic copolymer,
    about 1.5 to about 5 wt % of a surfactant,
    about 0.5 to about 1 wt % of a vinyl acetate monomer, and
    balance water.

6. The method of claim 1, wherein preparing the coating mixture includes combining the aqueous mixture with the aqueous dispersion mixture, such that a weight ratio of the aqueous mixture to the aqueous dispersion mixture is equivalent to a range of about 70 to about 90 pounds of the aqueous mixture to about 700 to about 900 pounds of the aqueous dispersion mixture.

7. The method of claim 1, further including dispersing, into the coating mixture, one or more of additional components of:
    a defoamer;
    a flow control agent;
    a plasticizer;
    a colorant; and
    a base.

8. The method of claim 7, wherein the additional components include one or more of:
    the defoamer includes a petroleum hydrocarbon-based foam control agents in a concentration equivalent to about 1 to about 3 pounds in the total weight of the mixture of the aqueous mixture plus the aqueous dispersion;
    the flow control agent includes ethylene glycol in a concentration equivalent to about 2 to about 4 pounds in the total weight of the mixture of the aqueous mixture plus the aqueous dispersion;

the plasticizer includes butyl benzyl phthalate and dipropylene glycol dibenzoate in a concentration equivalent to about 5 to about 10 pounds in the total weight of the mixture of the aqueous mixture plus the aqueous dispersion;

the colorant includes titanium dioxide in a concentration equivalent to about 1 to about 3 pounds in the total weight of the mixture of the aqueous mixture plus the aqueous dispersion; or the base includes ammonia hydroxide in a concentration equivalent to about 2 to about 4 pounds of an about 19 to 30 wt % aqueous ammonia hydroxide solution in the total weight of the mixture of the aqueous mixture plus the aqueous dispersion, so as to provide the aqueous mixture plus the aqueous dispersion with a pH of greater than 7.

* * * * *